United States Patent [19]

Holdaway

[11] 4,325,172

[45] Apr. 20, 1982

[54] ELASTIC RING EXPANDER

[75] Inventor: Ross J. Holdaway, Blenheim, New Zealand

[73] Assignee: Elastrator Company Limited, Blenheim, New Zealand

[21] Appl. No.: 94,295

[22] Filed: Nov. 14, 1979

[30] Foreign Application Priority Data

Nov. 14, 1978 [NZ] New Zealand .................. 188914

[51] Int. Cl.³ ............................................. B23P 19/02
[52] U.S. Cl. ....................................... 29/235; 29/450; 29/453
[58] Field of Search ............... 29/451, 450, 453, 229, 29/235

[56] References Cited

U.S. PATENT DOCUMENTS

| 2,329,275 | 9/1943 | Lenehan | 29/229 X |
| 3,101,528 | 8/1963 | Erdmann | 29/229 X |
| 3,581,379 | 6/1971 | Drobilits | 29/235 |
| 3,827,124 | 8/1974 | Hervieux | 29/235 |

Primary Examiner—Charlie T. Moon
Attorney, Agent, or Firm—Birch, Stewart, Kolasch & Birch

[57] ABSTRACT

A device for expanding elastic rings by sliding the rings along a conical mandrel. Rings in the expanded state are controllably released from the large diameter end of the mandrel. The rings are moved along the mandrel by either pneumatic or mechanical means.

5 Claims, 4 Drawing Figures

LOAD

AIR GAS OR LIQUID

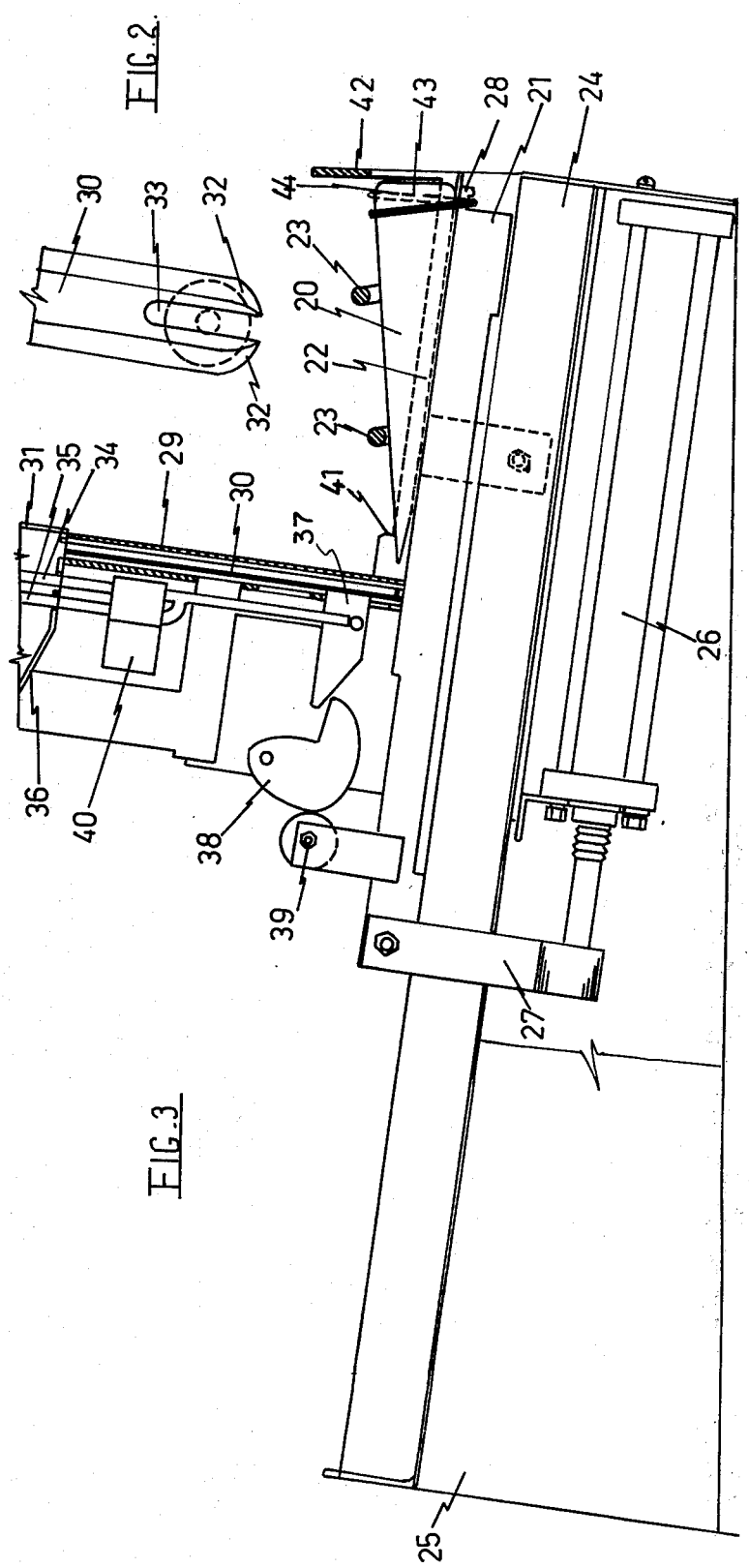

ELASTIC RING EXPANDER

BACKGROUND OF THE INVENTION

This invention relates to a method for expanding elastic rings and apparatus therefor.

Elastic rings, for example rubber rings, are used for a number of purposes of which sealing and clamping are two. The ring performs these functions by being applied about the object to be sealed or clamped while in an expanded state and stored elastic forces in the ring apply a contracting force. With heavy rubber rings considerable force is required to achieve expansion and where speed in application is of importance it is desirable that a machine expander be used to do this. Such a machine could be used to apply the rings about the object for which sealing or clamping was required, or to load an applicator tool which itself would release the ring about the object to be sealed or clamped.

SUMMARY OF THE INVENTION

It is an object of the present invention to provide an automatic ring expander of the type mentioned above and a method of operation therefor.

The essential mechanism by which the present invention achieves ring expansion is to move the ring along the outside surface of a conically shaped mandrel moving from the small diameter end to the large diameter end. The expanded ring can be released onto the object about which it is to reside by sliding off the large diameter end of the mandrel.

In one aspect the invention consists in a method for expanding elastic rings. The ring to be expanded is located over the small diameter end of a substantially conical mandrel and then a force is applied to the surface of the ring facing away from the large diameter end of said mandrel. The force is such as to move the ring to the large diameter end of the mandrel to thereby expand it. The ring is then held in the expanded state on the end of the mandrel pending subsequent release.

In a further aspect the invention consists in an automatic ring expander the central component of which is a substantially conical mandrel. Means locate each ring to be expanded over the small diameter end of said mandrel for subsequent forward movement along the mandrel. Force applying means apply a forward directed force to the ring sufficient to move it to the large diameter end of the mandrel. Ring release means which interact with the mandrel cause the ring to be removed from the mandrel over the object to which it is applied.

BRIEF DESCRIPTION OF THE DRAWINGS

FIG. 2 shows a detail of a loading member for the expander of FIGS. 3 and 4.

FIG. 3 is a longitudinal cross-section of part of the expander shown in FIG. 4 and, FIG. 4 is a side elevation of a ring expander with mechanical action,

DETAILED DESCRIPTION OF THE PREFERRED EMBODIMENTS

Figure 1:
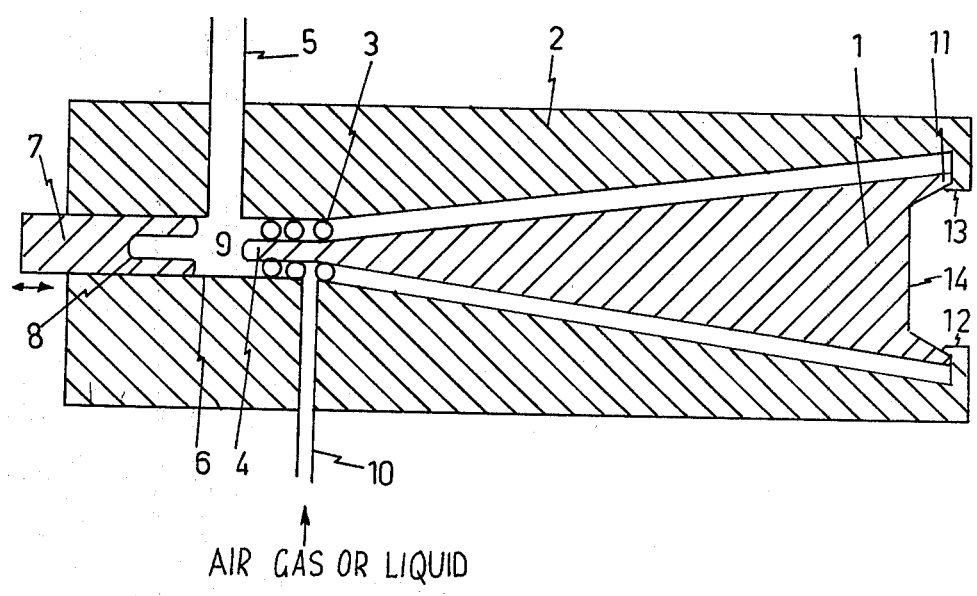
FIG. 1 shows diagrammatically a longitudinal cross-section of a compressed air ring expander.

In one embodiment of the invention which is shown in FIG. 1 a substantially conical mandrel 1 is located within a complementary cylinder 2, a substantial portion of the inside surface of which is conically shaped with a cone angle equal to that of the mandrel 1. Mandrel 1 is mounted concentrically within the cylinder 2 so that the clearance space between the mandrel and the cylinder is substantially equal to the radial thickness of the rings to be expanded. The internal surface of cylinder 2 is cylindrically shaped at the rear to provide a breach 6 which accommodates a mechanism for applying the rings to the small diameter end of the mandrel. The mandrel 1 has an extended portion 4 at the small diameter end which is substantially cylindrical rather than conical to facilitate loading the mandrel. A loading port 5 is provided through the wall of cylinder 2 through which rings to be expanded pass with the plane of the ring being at right angles to the mandrel axis. When each ring has entered breach 6 a shuttle loader 7 moves forward from the position shown in the diagram and pushes a ring (3) forward and over the extended portion 4 of mandrel 1. The forward face of shuttle 7 is provided with a bore 8 having a diameter slightly greater than portion 4 of the mandrel so that the ring contact surface 9 of shuttle 7 is able to move forward over the surface of the mandrel to ensure that the loaded ring 3 is left at a position forward of a cylinder port 10. Shuttle 7 then executes a rearward stroke to return to the position shown in the diagram.

The force required to move ring 3 to the large diameter end of the mandrel 1 is provided by a fluid (for example, air) under pressure. This is introduced through port 10 and during the supply of this fluid the loading port 5 is sealed so that the pressure in the breach 11 at the rear of the ring is increased substantially over the pressure forward of the ring producing a differential force which moves the ring forward along the mandrel surface. The pressure of the applied fluid is suitably adjusted to ensure that each ring to be expanded is moved the full length of mandrel 1.

Mandrel 1 is mounted within cylinder 2 so that a small amount of axial movement is possible and is forwardly biassed by the use of a compression spring so that a rim 11 formed in the large diameter end of mandrel 1 abuts against an inwardly directed flange provided at the end of cylinder 2. Accordingly when a ring reaches the large diameter end of mandrel 11 it is prevented from moving off the end of the mandrel by making contact with flange 12. When it is desired to release the expanded ring a ring applicator tool or object to be sealed or clamped is presented at the mouth 13 of cylinder 2 and pushed against the end face 14 of mandrel 1 to move the mandrel rearwardly against the spring force to provide a gap between rim 11 and flange 13 through which the expanded ring moves under its own elastic forces. The edges of rim 11 are suitably curved to facilitate release of the ring from the end of the mandrel.

Known control equipment is used to supply a charge of pressurised fluid through port 10 in sequence with the reciprocating motion of shuttle 7 and subsequent depression of mandrel 1. The rings to be expanded are contained in a hopper and fed through loading port 5 under the influence of gravity. A fresh ring drops into the breach 6 each time shuttle 7 moves rearwardly clear of the exit way of loading port 5.

Figure 4:
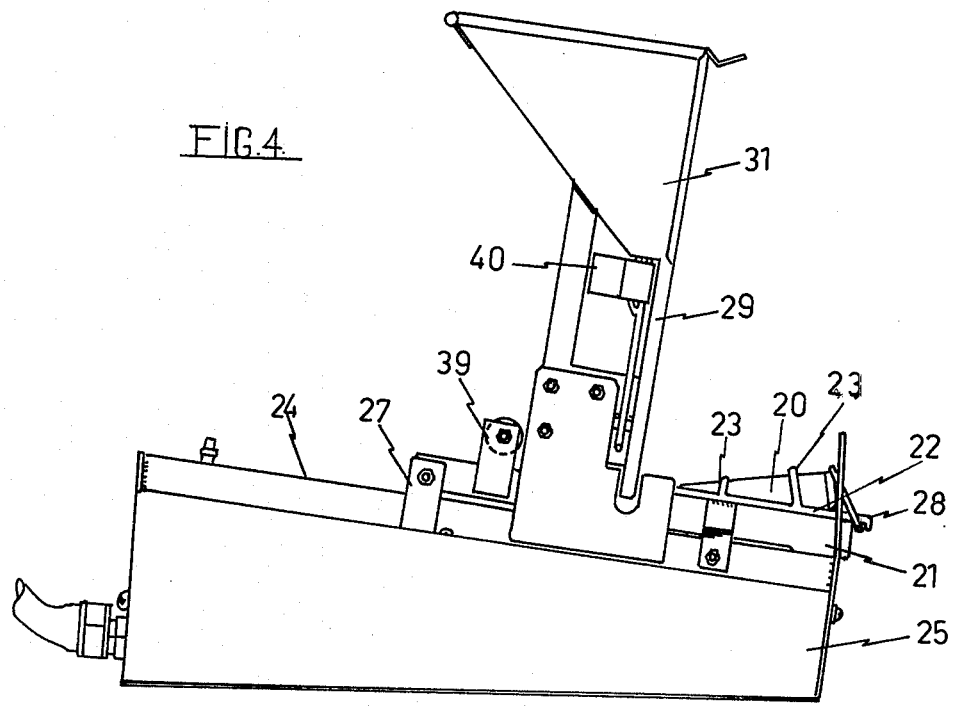

In a second embodiment of the invention illustrated in FIGS. 2, 3 and 4 the rings to be expanded are moved along the mandrel mechanically. The mandrel 20 is supported on the upper edge of a reciprocating push rod 21 and loosely restrained by a housing or cage comprising two transversely spaced parallel rods 22 and hoops 23. The mandrel is free to float in the longitudinal direction and in particular may be slid rearward of the position in which it is shown in FIGS. 3 and 4.

Push rod 21 slides on a rail 24 fixed to the expander body 25 and its primary purpose is to engage a ring to be expanded and force it over the mandrel 20. The push rod is moved longitudinally by a pneumatic ram 26 via a right angle link plate 27. The leading face of the push rod is shaped to form a nose 28 which when the push rod is moved forward from its rearward or loading position impales a ring supported in the bottom of chute 29 by a loading member 30. Loader 30 is free to slide up and down in chute 29 and the purpose of this movement will be explained later. The loader is channel shaped in cross section and together with the front wall of chute 29 defines a guide whereby rings from a hopper 31 are delivered to the loading position. The side walls at the bottom of loader 30 are curved inwards at 32 (see FIG. 2) to support the lower most ring (shown dotted) at a position such that the axis of the ring is in line with the centre line of the push rod nose 28. A slot 33 is provided in the bottom of the rear wall of loader 30 to allow the push rod to continue in forward direction without interference after snaring the bottom ring.

Rubber rings are stored in a hopper 31 and pass into chute 29 oriented in a vertical plane. The chute is always full with the bottom ring held by loader 30 as already explained. In order to ensure rings enter chute 29 from the hopper the rings in the hopper must be agitated from time to time. This is accomplished by the provision of fingers 34 and 35 which project vertically through the hopper floor 36 and are reciprocated by an arm 37 driven by cam 38. Cam 38 is in turn rotated counterclockwise to move arm 37 upwards via a roller assembly 39 fixed to push rod 21. Each time push rod 21 nears the end of a forward stroke fingers 34 and 35 are moved upwards to be later returned to their original position by virtue of a weight 40 when the push rod executes its return stroke and disengages the roller assembly from the cam. In addition to the agitating action of fingers 34 and 35 loader 30 is also reciprocated in synchronism. That is, the top of loader 30 is projected up into the interior of hopper 31 from the mouth of chute 29. It is for this purpose that a loader slidable within chute 29 is required. Arm 37 is fixed to loader 30 to cause this movement.

Operation commences with the pneumatic ram 26 extended and push rod 21 at the rear extremity of its stroke so that nose 28 is rearward of loader 30. The lowermost ring in chute 29 is held in the loading position by loader 30. Under the control of a pneumatic control system of a known configuration the ram is retracted and push rod 21 moves forward. Push rod nose 28 snares the ring presented by loader 30 and carries it forward so that it is impaled by the tip 41 of mandrel 20. The push rod continues its forward motion dragging the ring along the mandrel expanding it as it does so. Because of the forces exerted by the ring on the mandrel the mandrel is moved forward within hoops 23 until it abuts against an end plate 42. Near the end of the expansion stroke roller assembly 39 engages cam 38 and the rings in the hopper are agitated by fingers 34, 35 and loader 30. At the end of the stroke (as shown in FIG. 3) the ring is prevented from sliding off the mandrel by end plate 42. This plate is provided with an apperture in registration with and of approximately equal diameter to the large end of the mandrel.

The expanded ring is transferred from the mandrel to an applicator tool or directly to the article about which it is to be placed by pushing the tool or article against the recessed face 43 of the mandrel. The mandrel moves back (as it is free to do within the limits of the cage within which it floats) and the ring rolls off the mandrel to contract about the tool or article. The rim 44 on the large end of the mandrel is curved to facilitate release of the ring.

The operation of the return stroke apart from allowing the cycle to be repeated causes fingers 34, 35 and loader 30 to return to their normal position. Loader 30 thereby locates the next ring in the loading position.

In moving the ring to the large diameter end of the mandrel it will be appreciated that considerable frictional forces must be overcome as well as the elastic restoring forces in the ring. To reduce the frictional force the mandrel is preferably made from a material having a low coefficient of friction, for example, PTFE or stainless steel. Alternatively a surface coating having a low coefficient of friction could be applied to a body material having a higher coefficient of friction.

What we claim is:

1. An automatic elastic ring expander comprising: a substantially conical mandrel; a reciprocable push member which runs adjacent the surface of the mandrel; a fixed housing within which the mandrel is loosely held to allow some axial movement of the mandrel, the housing being open at each of opposite ends to allow placement of a ring to be expanded on the small diameter end and the removal of the expanded ring from the large diameter end of the mandrel; mandrel loading means, separate from the mandrel, which locates a ring to be expanded in a plane substantially at right angles to the mandrel axis with the ring center lying approximately on the line of the mandrel axis adjacent the small diameter end of the mandrel, the ring then being positioned such that, on a forward stroke of the push member, the push member engages the ring, locates it on the small diameter end of the mandrel and forces it to the large diameter end of the mandrel, thereby also moving the mandrel forwardly in the housing; and restraining means which abuts the periphery of the large diameter end of the mandrel and limits its said forward movement, the restraining means restraining the expanded ring from slipping off the large diameter end of the mandrel under the inherent contraction forces exerted by the expanded ring, release of the ring being effected by pushing the mandrel back from the restraining means.

2. A ring expander according to claim 1 wherein said restraining means comprises a plate located in a plane at right angles to the mandrel axis and provided with an apperture having a diameter substantially equal to the large diameter end of the mandrel and a center which lies on the axis of said mandrel.

3. A ring expander according to claim 2 including a hopper for holding rings to be expanded, and an chute for feeding rings from said hopper to said loading means.

4. A ring expander according to claim 3 wherein the hopper is provided with vertically reciprocating agitating means.

5. A ring expander as claimed in any one of claim 1 through 4 wherein the mandrel is supported on the push member.

* * * * *